United States Patent
Kushnarenko (10) Patent No.: US 6,184,594 B1
(45) Date of Patent: Feb. 6, 2001

(54) MULTI-STAGE CHARGE PUMP HAVING HIGH-VOLTAGE PUMP CONTROL FEEDBACK AND METHOD OF OPERATING SAME

(75) Inventor: Alexander Kushnarenko, Haifa (IL)

(73) Assignee: Tower Semiconductor Ltd., Migdal Haemek (IL)

( * ) Notice: Under 35 U.S.C. 154(b), the term of this patent shall be extended for 0 days.

(21) Appl. No.: 09/244,318

(22) Filed: Feb. 4, 1999

(51) Int. Cl.[7] ..................................................... H02M 3/18
(52) U.S. Cl. ......................... 307/109; 307/110; 307/536; 363/60
(58) Field of Search .................................... 307/109, 110; 363/59, 60; 327/536, 390

(56) References Cited

U.S. PATENT DOCUMENTS

| | | | |
|---|---|---|---|
| 5,051,882 | * 9/1991 | Grimm et al. ........................ | 363/60 |
| 5,057,707 | * 10/1991 | Pigott .................................. | 327/536 |
| 5,436,587 | * 7/1995 | Cernea ................................ | 327/536 |
| 5,543,668 | 8/1996 | Fong . | |
| 5,623,222 | * 4/1997 | Tamagawa .......................... | 327/259 |
| 5,717,581 | * 2/1998 | Canclini ............................. | 307/110 |

* cited by examiner

Primary Examiner—Albert W. Paladini
(74) Attorney, Agent, or Firm—Bever, Hoffman & Harms, LLP; E. Eric Hoffman (57) ABSTRACT

A charge pump circuit having a plurality of serially-connected stages. A first stage, which operates in response to a $V_{DD}$ supply voltage and a clock signal, alternately charges and discharges a pair of capacitors to generate a pair of first output voltages, each having a peak voltage which is approximately twice the $V_{DD}$ supply voltage. The first output voltages are provided to a second stage. The second stage alternately charges and discharges a pair of capacitors using the first output voltages, thereby generating a pair of second output voltages that are approximately twice the first output voltage. Each successive charge pump stage uses the output voltages provided by the previous stage to generate output voltages that are approximately twice as large. Some voltage drop is experienced as the output voltages are transmitted from stage to stage through pass transistors. The output voltages provided by various stages can be fed back to control the charging and discharging of the capacitors within the stages. For example, the second output voltages can be fed back to the second stage to control pass transistors that are used to charge capacitors within the second stage.

13 Claims, 6 Drawing Sheets

MULTI-STAGE CHARGE PUMP HAVING HIGH-VOLTAGE PUMP CONTROL FEEDBACK AND METHOD OF OPERATING SAME

FIELD OF THE INVENTION

The present invention relates to a charge pump circuit for generating a voltage on an integrated circuit device. More specifically, the present invention relates to a multistage charge pump having high-voltage pump control feedback.

BACKGROUND OF THE INVENTION

Figure 1:
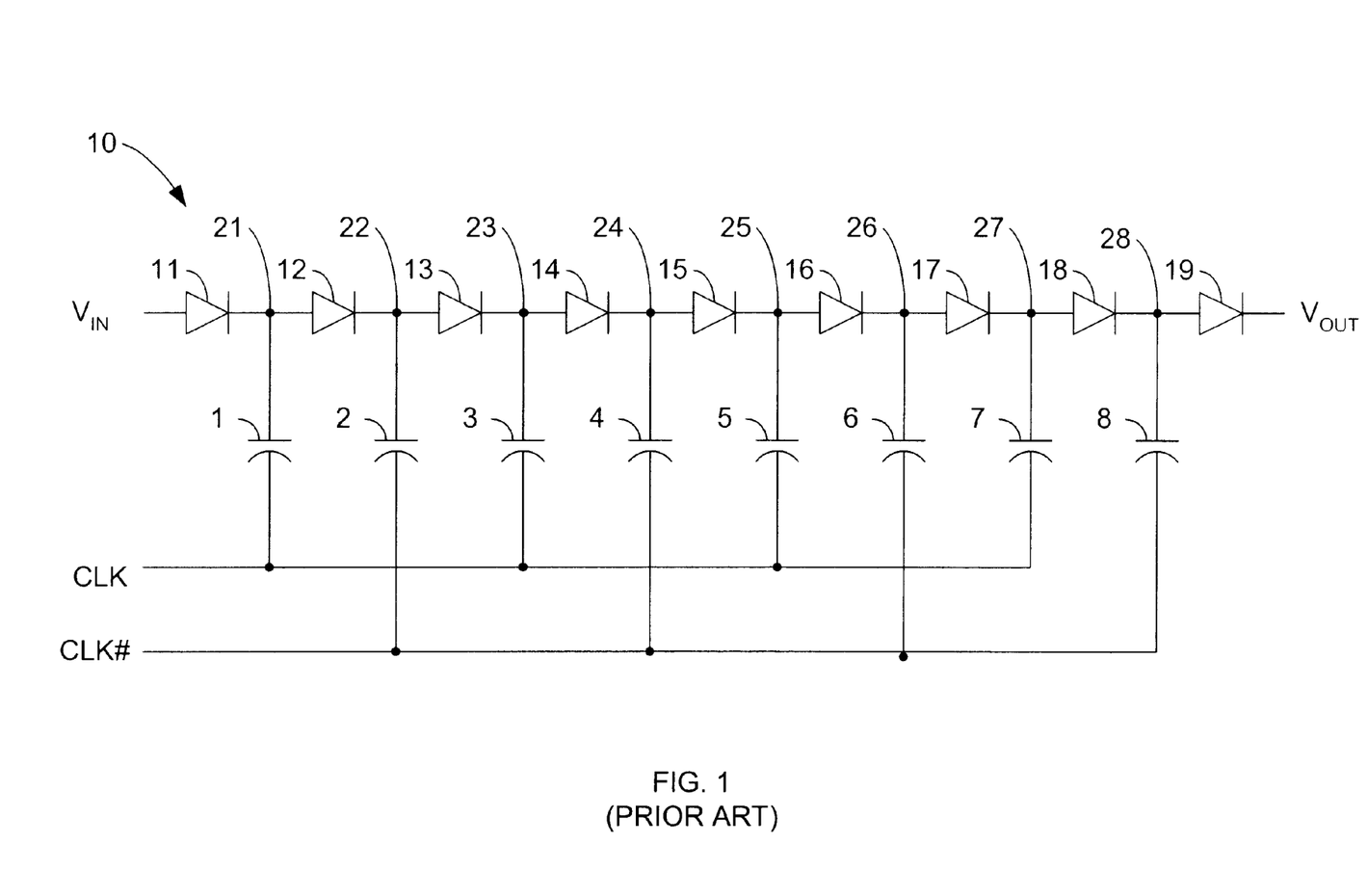
FIG. 1 is a circuit diagram of a conventional charge pump circuit.

FIG. 1 is a circuit diagram of a conventional charge pump 10 used to generate a voltage on an integrated circuit chip. Charge pump 10 makes use of capacitors 1–8, which are coupled to diodes 11–19 as illustrated. Capacitors 1, 3, 5, and 7 are coupled in parallel to receive clock signal CLK, and capacitors 2, 4, 6 and 8 are coupled in parallel to receive clock signal CLK#. Clock signal CLK# is the inverse of clock signal CLK.

An input voltage $V_{IN}$ is provided to diode 11 and an output voltage $V_{OUT}$ is generated at the output terminal of diode 19. Charge Pump 10 operates by pumping charge along diodes 11–19 as the capacitors 1–8 are successively charged and discharged during each half clock cycle. The voltages at nodes 21–28 are not reset after each pumping cycle. Consequently, the average potential of nodes 21–28 progressively increases from node 21 to node 28.

Charge pump 10 has several disadvantages. First, each of diodes 11–19 experiences a series voltage drop. The sum of these voltage drops limits the voltage generated at the output terminal of diode 19. Thus, many stages are required to generate a high voltage. In addition, it takes many clock cycles to charge capacitors 1–8 to provide the desired output voltage level. This latency exists because charge pump 10 sequentially charges one capacitor at a time, beginning with capacitor 1 and ending with capacitor 8. The output terminal of diode 19 does not reach the desired voltage until capacitor 8 is charged.

Other conventional charge pumps charge a plurality of capacitors in parallel during a first cycle, and then discharge in the capacitors in series during a second cycle, thereby generating a relatively large voltage. Such a charge pump is described in U.S. Pat. No. 5,543,668. However, each stage of this charge pump only increases the output voltage by about $V_{CC}$. It therefore requires a relatively large number of stages to generate an output voltage that is significantly greater than the input voltage. For example, this charge pump would require at least five stages to generate an output voltage of 16 Volts.

It would therefore be desirable to have a charge pump that generates a high output voltage in a relatively small number of stages. It would also be desirable if such a charge pump is able to provide the high output voltage in a relatively small number of clock cycles.

SUMMARY

Accordingly, the present invention provides a multistage charge pump that virtually doubles the input voltage in every stage, less pass transistor voltage drops. In a particular circuit, an input voltage of about 2.7 Volts is translated to an output voltage having a peak of about 19.55 Volts in three charge pump stages. The charge pump provides a peak output voltage of 16 Volts about 3 clock cycles after the charge pump is enabled. After about 8 clock cycles, the charge pump provides a peak output voltage of about 19.55 Volts.

In one embodiment, the charge pump comprises three stages. The first stage, which operates in response to a $V_{DD}$ supply voltage and a clock signal, alternately charges and discharges a pair of capacitors to generate a pair of first output voltages. Each of the first output voltages has a peak voltage which is approximately twice the $V_{DD}$ supply voltage. More specifically, in a particular embodiment, each of the first output voltages has a peak voltage equal to two times the $V_{DD}$ supply voltage minus the voltage drop of a pass transistor. If the $V_{DD}$ supply voltage is equal to 2.7 Volts and the pass transistor voltage drop is 0.15 Volts, then the first output voltages have a peak voltage of 5.25 Volts (i.e., (2×2.7 Volts)−0.15 Volts). The first output voltages are provided to control a second stage.

The second stage alternately charges and discharges a pair of capacitors in response to the first output voltages, thereby generating a pair of second output voltages. Each of the second output voltages has a peak voltage which is approximately two times the peak of the first output voltages. In a particular embodiment, the second output voltage has a peak voltage equal to four times the $V_{DD}$ supply voltage minus three times the pass transistor voltage drop (e.g., 10.35 Volts, or (4×2.7 Volts)−(3×0.15 Volts)). The second output voltages can be fed back to the second stage to bias a pair of pass transistors that are enabled to charge the pair of capacitors in the second stage. Providing the relatively high second output voltages to bias these pass transistors advantageously enables the capacitors in the second stage to be charged to a high voltage.

The third stage alternately charges and discharges a pair of capacitors in response to the second output voltages, thereby generating a pair of third output voltages. Each of the third output voltages has a peak voltage which is approximately two times the peak of the second output voltages. In a particular embodiment, the third output voltage has a peak voltage equal to eight times the $V_{DD}$ supply voltage minus seven times the pass transistor voltage drop and one diode voltage drop (e.g., 19.55 Volts, or (8×2.7 Volts)−(7×0.15 Volts)−1.0 Volt). The third output voltages can be fed back within the third stage to bias a pair of pass transistors that are enabled to charge the pair of capacitors in the third stage. Providing the relatively high third output voltages to bias these pass transistors advantageously enables the capacitors in the third stage to be charged to a high voltage.

In other embodiments, the present invention can include more than three stages. Each successive stage receives the output voltages provided by a previous stage, and in response, generates output voltages that are approximately twice as large. As indicated above, some voltage drop is experienced as the output voltages are transmitted from stage to stage through pass transistors. The output voltages provided by various stages can be fed back to control the charging of the capacitors within the stages.

The present invention will be more fully understood in view of the following description and drawings.

DETAILED DESCRIPTION

Figure 2:
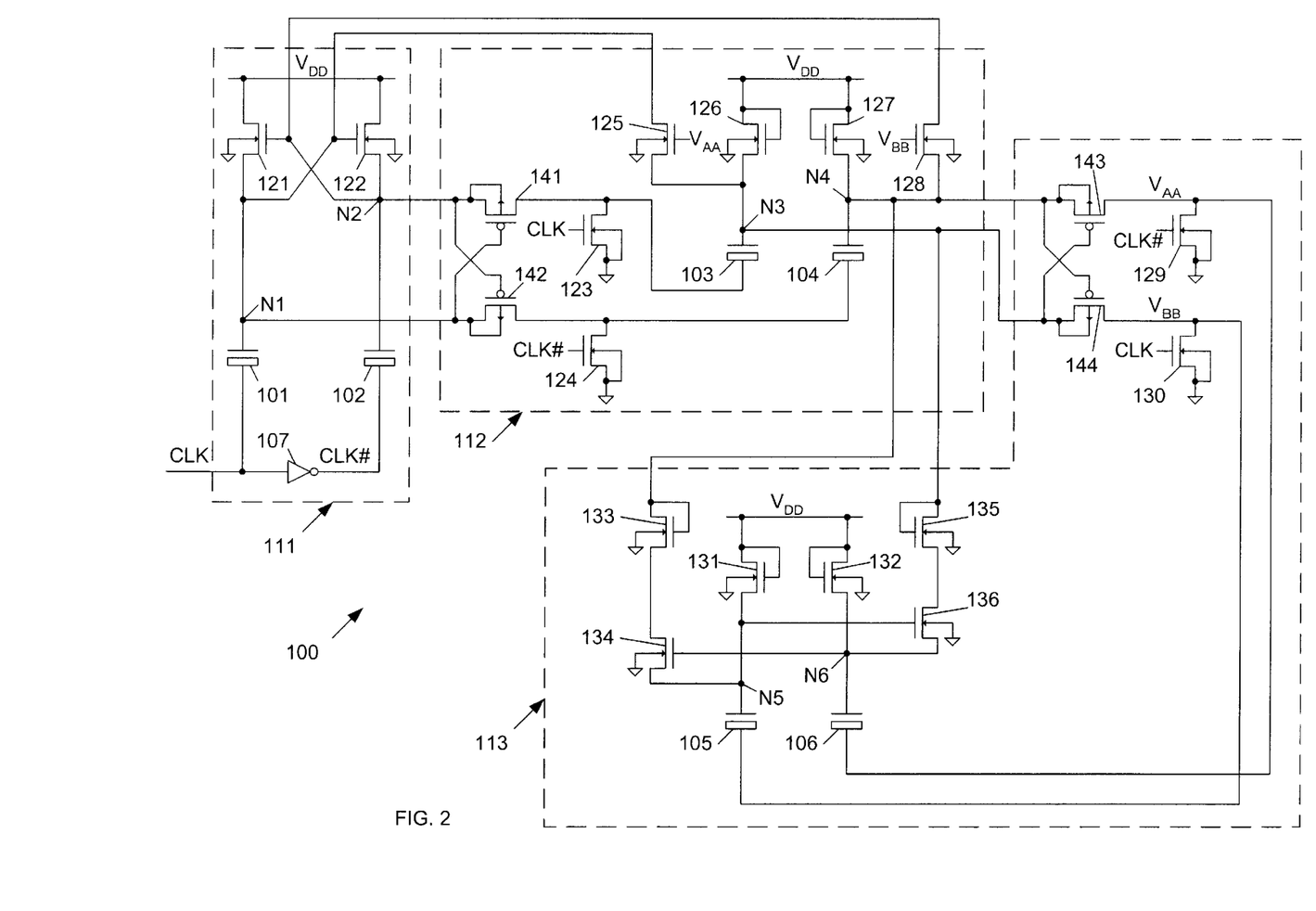
FIG. 2 is a circuit diagram of a multi-stage charge pump in accordance with one embodiment of the present invention.

FIG. 2 is a circuit diagram of a multi-stage charge pump 100 in accordance with one embodiment of the present invention. Charge pump 100 includes $V_{DD}$ and ground supply terminals, capacitors 101–106, inverter 107, n-channel field effect transistors 121–136, and p-channel field effect transistors 141–144. In the described example, the $V_{DD}$ and ground supply terminals are configured to provide nominal voltages of 2.7 Volts and 0 Volts, respectively. Capacitors 101–106 can be conventional semiconductor capacitors, or can be MOS transistors having their source and drain regions commonly connected to form one terminal of the capacitor, with their gate forming the other terminal of the capacitor.

Charge pump 100 has three stages, including first stage 111, second stage 112 and third stage 113. Although the present invention is described in connection with a charge pump having three stages, it is understood that in other embodiments, this charge pump can be modified to have other numbers of stages (e.g., 2, 4, etc.), without departing from the scope of the present invention. First stage 111 includes capacitors 101–102, inverter 107 and n-channel transistors 121–122. Second stage 112 includes capacitors 103–104, n-channel transistors 123–128 and p-channel transistors 141–142. Third stage 113 includes capacitors 105–106, n-channel transistors 129–136 and p-channel transistors 143–144. All of the transistors in charge pump 100 are high voltage transistors. More specifically, each of the transistors in the first and second stages is designed to have a gate oxide that is capable of handling voltages of up to approximately 12 Volts. The transistors in the third stage are designed to have a gate oxide that is capable of handling voltages of approximately 20 Volts.

In general, each of the three stages 111–113 receives an input signal, and in response, provides an output signal having a peak voltage that is about twice as large as the peak voltage of the input signal, minus any applicable pass transistor voltage drops and diode voltage drops. Thus, first stage 111 receives an input signal that has a peak voltage of about 2.7 Volts, and in response, provides an output signal having a peak voltage of about 5.25 Volts. Second stage 112 receives the output signal from first stage 111, and in response, provides an output signal having a peak voltage of about 10.35 Volts. Finally, third stage 113 receives the output signal from second stage 112, and in response, generates an output signal having a peak voltage of about 19.55 Volts.

Because each stage doubles the received input voltage, the voltage generated can become very high in a relatively small number of stages. Moreover, because the output voltage is generated by a relatively small number of stages, the full output voltage is generated relatively quickly (i.e., exponentially) at start up.

First Stage

Figure 3:
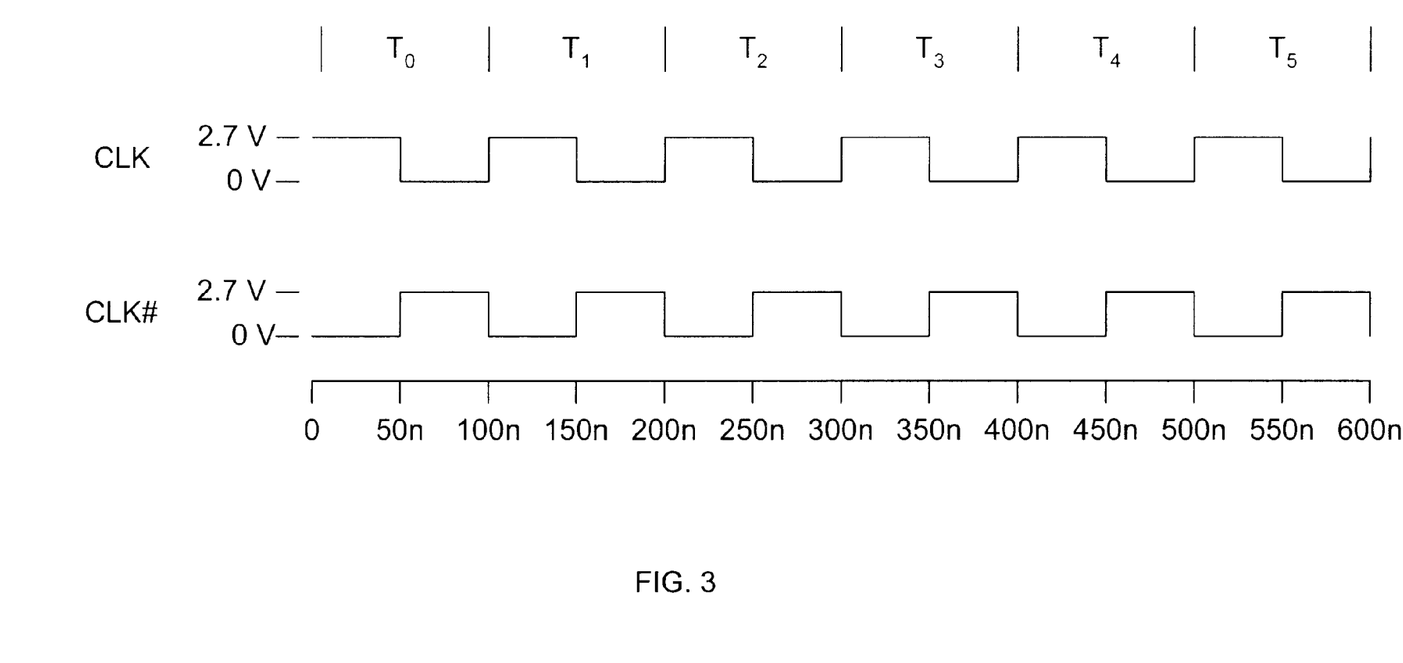
FIGS. 3–9 are waveform diagrams illustrating some of the voltages present in the multi-stage charge pump of FIG. 2 in accordance with one embodiment of the present invention.

First stage 111 will now be described. A clock signal (CLK) is provided to first stage 111. The CLK signal is applied to a first terminal of capacitor 101. The CLK signal is also applied to inverter 107, thereby generating a clock signal (CLK#) that is inverted with respect to the CLK signal. The CLK# signal is applied to a first terminal of capacitor 102. FIG. 3 is a waveform diagram illustrating the CLK and CLK# signals.

The second terminals of capacitors 101 and 102, which are labeled N1 and N2, respectively, are coupled to the $V_{DD}$ voltage supply terminal through transistors 121 and 122, respectively. The substrates of transistors 121 and 122 are connected to the ground supply terminal, and the gates of transistors 121 and 122 are connected to nodes N2 and N1, respectively. These connections effectively cause transistors 121 and 122 to operate as switches.

FIGS. 4–9 are waveform diagrams that illustrate various voltages generated by charge pump 100. FIGS. 4–9 assume that at the beginning of clock cycle To, nodes N1 and N2 are pulled up to a voltage of about 1 Volt through transistors 121 and 122, respectively. The voltages on nodes N1 and N2 are designated as voltages $V_{N1}$ and $V_{N2}$, respectively.

Figure 4:
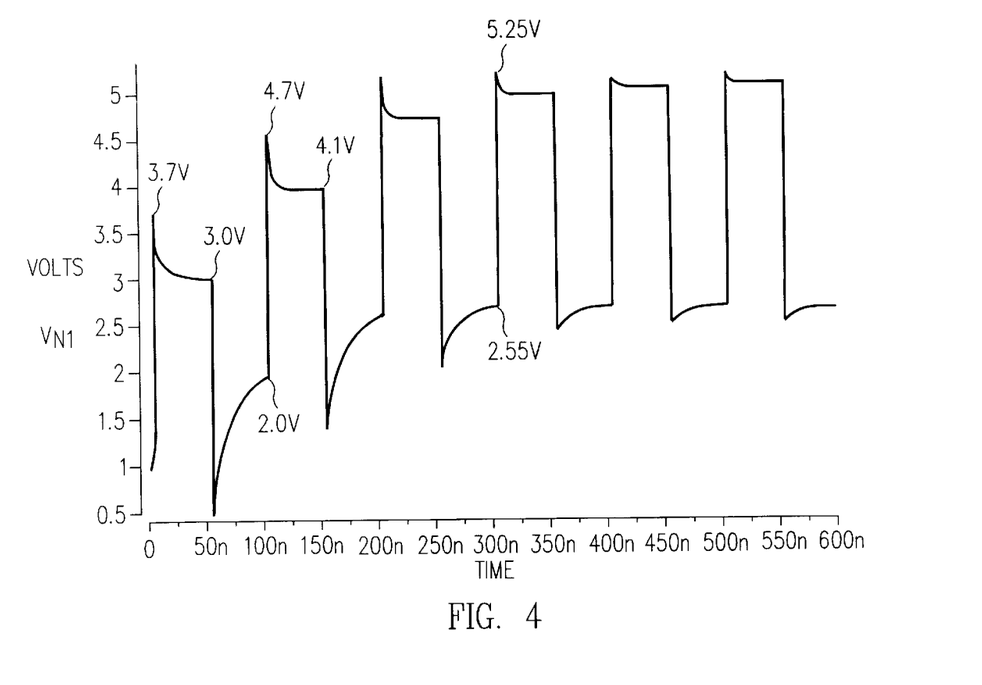
Figure 5:
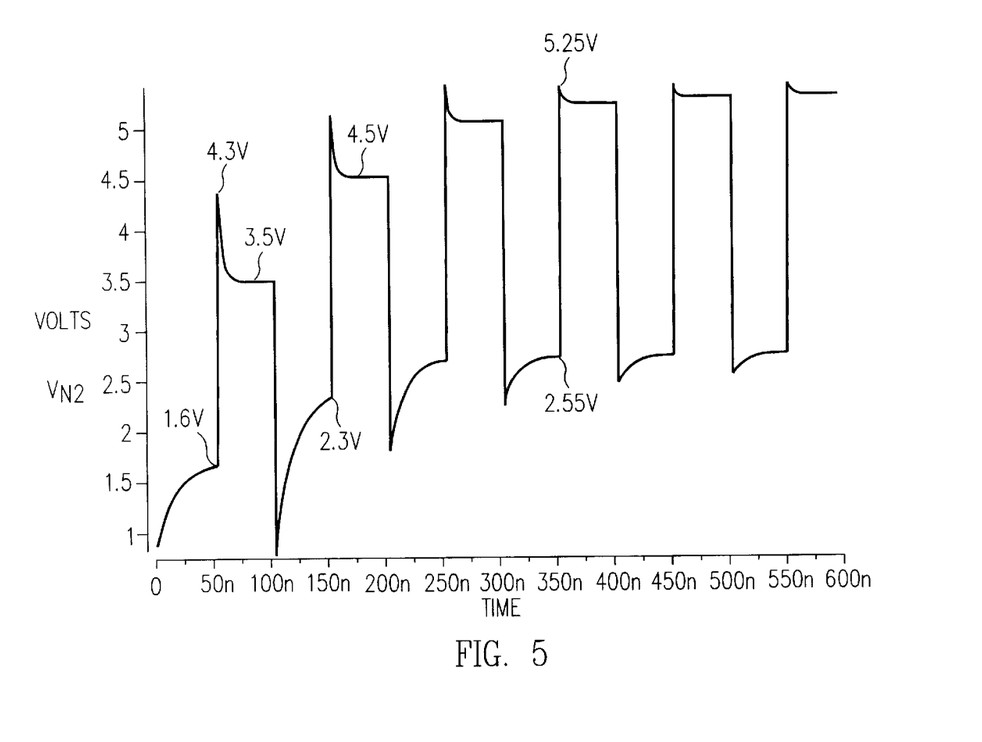

FIGS. 4 and 5 are waveform diagrams of voltages $V_{N1}$ and VN2, respectively. As illustrated in FIG. 3, during the first half of clock cycle $T_0$, the CLK signal has a voltage equal to the $V_{DD}$ supply voltage (e.g., 2.7 Volts). Also during the first half of cycle $T_0$, inverter 107 provides a CLK# signal having a voltage equal to 0 Volts to the first terminal of capacitor 102. Under these conditions, the voltage $V_{N1}$, which was previously about 1 Volt, is boosted to a peak voltage of about 3.7 Volts (i.e., 1 Volt plus the 2.7 Volt CLK signal). The voltage $V_{N1}$ settles to a voltage of about 3.0 Volts during the first half of cycle To. As described in more detail below, the boosted voltage $V_{N1}$ is provided as an input signal to second stage 112.

During the first half of cycle $T_0$, the voltage $V_{N1}$ is high enough to turn on transistor 122, thereby causing the voltage $V_{N2}$ to be pulled up. When transistor 122 is turned on, the voltage $V_{N2}$ is equal to the $V_{DD}$ supply voltage minus the voltage drop across transistor 122. In the described embodiment, the voltage drop across transistor 122 is equal to about 0.15 Volts during the first half of cycle $T_0$. Consequently, the voltage $V_{N2}$ is equal to about 2.55 Volts (i.e., 2.7 Volts–0.15 Volts) under these conditions. With the voltage $V_{N2}$ equal to 2.55 Volts, and the voltage applied to the first terminal of capacitor 102 equal to 0 Volts, capacitor 102 charges to a voltage of about 1.6 Volts during the first half of cycle $T_0$.

Halfway through clock cycle $T_0$, the CLK signal changes states. Thus, the CLK signal transitions to a voltage of 0 Volts, and the CLK# signal transitions to a voltage of 2.7 Volts. Because capacitor 102 was previously charged to a voltage of 1.6 Volts during the first half of clock cycle $T_0$, the voltage VN2 is boosted to approximately 4.3 Volts (i.e., 2.7 Volts+1.6 Volts) during the second half of clock cycle $T_0$. As described in more detail below, the boosted voltage $V_{N2}$ is provided as an input signal to second stage 112. Note that the charge stored in capacitor 102 during the first half of clock cycle $T_0$ is discharged during the second half of clock cycle $T_0$.

Also during the second half of clock cycle $T_0$, the voltage $V_{N2}$ is high enough to turn on transistor 121. As a result, the voltage $V_{N1}$ is pulled up to a voltage equal to the $V_{DD}$ supply voltage minus the voltage drop across transistor 121. Under these conditions, the voltage drop across transistor 121 is equal to about 0.15 Volts. Consequently, the voltage $V_{N1}$ is equal to about 2.55 Volts (i.e., 2.7 Volts–0.15 Volts). With the voltage $V_{N1}$ equal to 2.55 Volts, and the voltage applied to the first terminal of capacitor 101 equal to 0 Volts, capacitor 102 charges to a voltage of 2.0 Volts during the second half of clock cycle To.

At the beginning of clock cycle $T_1$, the CLK signal again changes states, with the CLK signal transitioning to a voltage of 2.7 Volts, and the CLK# signal transitioning to a voltage of 0 Volts. Because capacitor 101 was previously charged to a voltage of 2.0 Volts during the second half of clock cycle $T_0$, the voltage $V_{N1}$ is boosted to approximately 4.7 Volts (i.e., 2.7 Volts+2.0 Volts) during the first half of clock cycle $T_1$. The boosted voltage $V_{N1}$ settles to about 4.1

Volts during the first half of clock cycle $T_1$. Note that the charge stored in capacitor 103 during the second half of clock cycle To is discharged during the first half of clock cycle $T_1$.

Also during the first half of clock cycle $T_1$, the voltage $V_{N1}$ is high enough to turn on transistor 122, again causing a voltage of about 2.55 Volts to be applied to node N2. As a result, capacitor 101 charges to a voltage of 2.3 Volts during the first half of clock cycle $T_1$. The abovedescribed cycle repeats, such that during the first half of each clock cycle, capacitor 102 charges and capacitor 101 discharges, and during the second half of each clock cycle, capacitor 102 discharges and capacitor 101 charges.

By about the third clock cycle $T_2$, the voltages $V_{N1}$ and $V_{N2}$ become high enough to enable capacitors 101 and 102 to charge to a voltage which is equal to the $V_{DD}$ supply voltage (2.7 Volts) minus the pass transistor voltage drop (0.15 Volts), or about 2.55 Volts. Capacitors 101 and 102 then discharge to a voltage which is equal to 2.55 Volts plus the $V_{DD}$ supply voltage (2.7 Volts), or 5.25 Volts. Consequently, the voltages $V_{N1}$ and $V_{N2}$ transition between 5.25 Volts and 2.55 Volts in the manner illustrated in FIGS. 4 and 5. The peak voltage of the output signal provided by first stage 111 is therefore twice the peak voltage of the input signal received by first stage 111, minus the pass transistor voltage drop across transistor 121 (or 122).

Second Stage

The voltages $V_{N1}$ and $V_{N2}$ are provided to second stage 112. Second stage 112 is configured as follows. The source of n-channel transistor 125, the gate of p-channel transistor 141, and the source and substrate of p-channel transistor 142 are all coupled to receive the voltage VN1 The source of n-channel transistor 128, the gate of p-channel transistor 142, and the source and substrate of p-channel transistor 141 are coupled to receive the voltage $V_{N2}$.

The drain of p-channel transistor 141 is coupled to the drain of n-channel transistor 123 and to a first terminal of capacitor 103. Similarly, the drain of p-channel transistor 142 is coupled to the drain of n-channel transistor 124 and to a first terminal of capacitor 104. The gates of n-channel transistors 123 and 124 are configured to receive the CLK and CLK# signals, respectively. The sources and wells of n-channel transistors 123 and 124 are connected to the ground supply terminal. The second terminals of capacitors 103 and 104 are labeled as nodes N3 and N4, respectively. The voltages on nodes N3 and N4 are designated $V_{N3}$ and $V_{N4}$, respectively. Node N3 is coupled to the drains of n-channel transistors 125 and 126. Node N4 is coupled to the drains of n-channel transistors 127 and 128. Nodes N3 and N4 are also coupled to third stage 113 in a manner described in more detail below. The wells of transistors 125–128 are connected to the ground supply terminal. The sources and gates of n-channel transistors 126 and 127 are connected to the $V_{DD}$ voltage supply terminal. Consequently, transistors 126 and 127 are connected as diodes between the $V_{DD}$ supply voltage terminal and nodes N3 and N4, respectively. The gates of n-channel transistors 125 and 128 are configured to receive feedback control voltages $V_{AA}$ and $V_{BB}$, respectively, from third stage 113.

Figure 6:
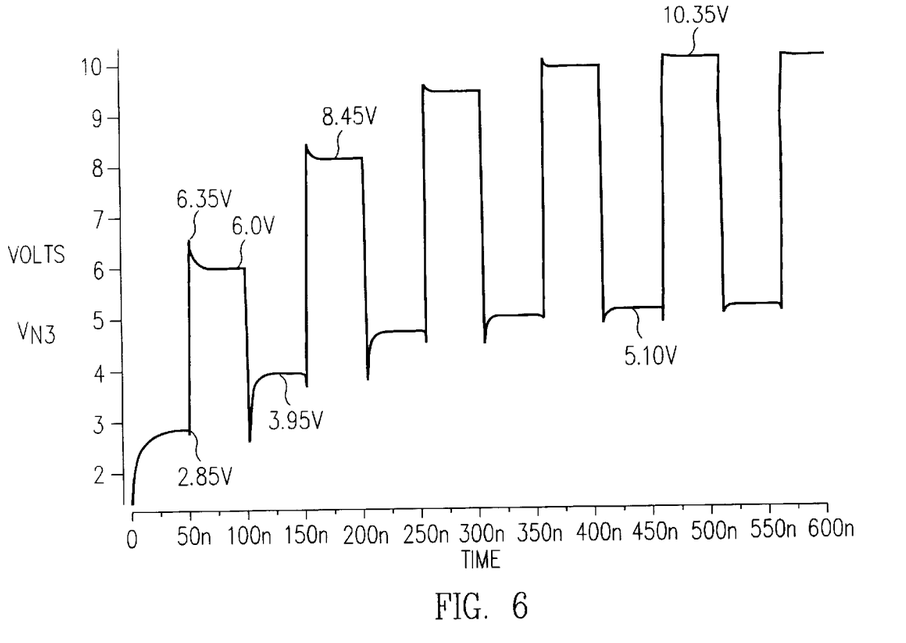
Figure 7:
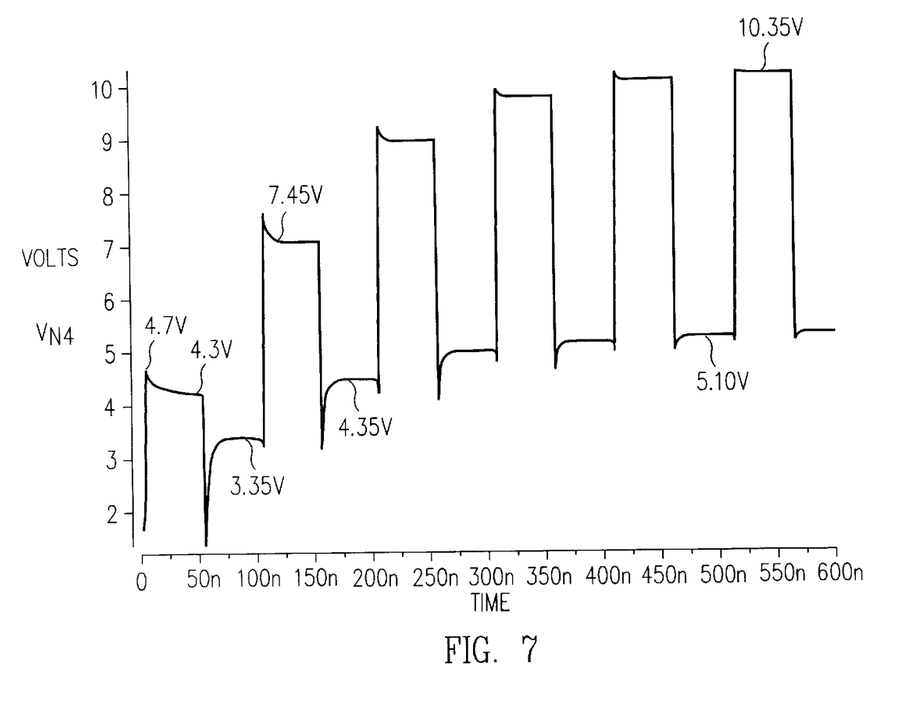

The operation of second stage 112 will now be described. FIGS. 6 and 7 are waveform diagrams illustrating voltages $V_{N3}$ and $V_{N4}$, respectively. In general, second stage 112 includes a pair of capacitors 103 and 104 that are alternately charged and discharged in manner similar to capacitors 101 and 102. However, capacitors 103 and 104 generate voltages that are about twice as large as the voltages generated by capacitors 101 and 102.

During the first half of clock cycle $T_0$, transistor 124 is turned off. As described above, during the first half of clock cycle To, the voltage $V_{N1}$ is between 3.7 Volts and 3.0 Volts, and the voltage $V_{N2}$ is about 1.6 Volts or less. Under these conditions, p-channel transistor 142 is turned on because the voltage on the gate of p-channel transistor 142 is more than one threshold voltage less than the voltage on the source of p-channel transistor 142. Turned on p-channel transistor 142 transfers the voltage $V_{N1}$ of 3.7 Volts to the first terminal of capacitor 104. Because the voltage VN4 was previously pulled up to about 2.0 Volts through diode-connected transistor 127, the voltage $V_{N4}$ is boosted to about 4.7 Volts at the beginning of the first half of cycle $T_0$. As the first half of cycle $T_0$ progresses, the voltage $V_{N4}$ settles to 4.3 Volts. At this time, the boosted voltage $V_{N4}$ is greater than the voltage $V_{N3}$, thereby turning on p-channel transistor 143 in third stage 113. As a result, an average boosted voltage $V_{N4}$ of about 4.5 Volts is provided as control voltage $V_{AA}$.

Also during the first half of clock cycle $T_0$, the logic high CLK signal turns on transistor 123, thereby coupling the first terminal of capacitor 103 to the ground supply terminal. At this time, the control voltage $V_{AA}$ of 4.5 Volts is applied to the gate of transistor 125, and the voltage $V_{N1}$ of about 3.0 Volts is applied to the drain of transistor 125 (See, FIG. 4). Under these conditions, transistor 125 turns on, and node N3 is pulled up to a voltage of about 2.85 Volts (i.e., 3.0 Volts minus the pass transistor drop voltage of 0.15 Volts across transistor 125). Capacitor 103 charges to a voltage of about 2.85 Volts under these conditions.

As described above, during the second half of clock cycle $T_0$, the voltage $V_{N2}$ is about 3.5 Volts and the voltage $V_{N1}$ is about 2.0 Volts. Under these conditions, p-channel transistor 141 is turned on because the voltage on the gate of p-channel transistor 141 is more than one threshold voltage less than the voltage on the source of p-channel transistor 141. Turned on p-channel transistor 141 transmits the voltage $V_{N2}$ of 3.5 Volts to the first terminal of capacitor 103. Because capacitor 103 was previously charged to a voltage of about 2.85 Volts during the first half of clock cycle $T_0$, the voltage $V_{N3}$ is boosted to a peak voltage of about 6.35 Volts (and settles to about 6.0 Volts). At this time, the voltage $V_{N3}$ is greater than the voltage $V_{N4}$, thereby turning on p-channel transistor 144 in third stage 113. As a result, an average boosted voltage $V_{N3}$ of about 6.0 Volts is provided as control voltage $V_{BB}$.

Also during the second half of clock cycle $T_0$, the logic high CLK# signal turns on transistor 124, thereby coupling the first terminal of capacitor 104 to the ground supply terminal. At this time, the control voltage $V_{BB}$ of 6.0 Volts is applied to the gate of transistor 128, and the voltage $V_{N2}$ of about 3.5 Volts is applied to the drain of transistor 128 (See, FIG. 5). Under these conditions, transistor 128 turns on, and node N4 is pulled up to a voltage of about 3.35 Volts (i.e., 3.5 Volts minus the pass transistor drop voltage of 0.15 Volts across transistor 128). Capacitor 104 charges to a voltage of about 3.35 Volts under these conditions.

Note that the relatively high voltage of 3.5 Volts applied to the drain of transistor 128 makes it somewhat difficult turn on this transistor. However, by routing the boosted control voltage $V_{BB}$ as a feedback voltage, a control voltage sufficient to turn on transistor 128 is provided.

During the first half of clock cycle $T_1$, the logic low CLK# signal turns off transistor 124. In addition, p-channel transistor 142 is turned on, thereby transmitting the voltage $V_{N1}$ of about 4.1 Volts to the first terminal of capacitor 104. As discussed above, capacitor 104 was previously charged to a voltage of 3.35 Volts during the second half of the previous clock cycle $T_0$. As a result, the voltage $V_{N4}$ is boosted to about 7.45 Volts. At this time, the voltage $V_{N4}$ is more than one threshold voltage greater than the voltage $V_{N3}$. Consequently, p-channel transistor 143 turns on, the voltage $V_{N4}$ of 7.45 Volts to be transmitted as the control voltage $V_{AA}$.

Also during the first half of clock cycle $T_1$, the logic high CLK signal turns on transistor 123, thereby coupling the first terminal of capacitor 103 the ground supply terminal. As previously described, the control voltage $V_{AA}$ has a value of about 7.45 Volts. Because the control voltage $V_{AA}$ is more than one threshold voltage greater than the voltage $V_{N1}$ applied to the drain of transistor 125 (i.e., 4.1 Volts), transistor 125 turns on. Under these conditions, node N4 is pulled up to a voltage of about 3.95 Volts (i.e., 4.1 Volts minus the pass transistor voltage drop of 0.15 Volts across transistor 125). Capacitor 103 charges to a voltage of about 3.95 Volts under these conditions.

During the second half of clock cycle $T_1$, the logic low CLK signal turns off transistor 123, and the first terminal of capacitor 103 is coupled to receive the voltage $V_{N2}$, which at this time is equal to abut 4.5 Volts (See, FIG. 5). Because capacitor 103 was charged to 3.95 Volts during the first half of cycle $T_1$, the voltage $V_{N3}$ is boosted to a voltage of about 8.45 Volts. At this time, the voltage $V_{N3}$ is more than one threshold voltage greater than the voltage $V_{N4}$. Consequently, p-channel transistor 144 turns on, thereby causing the voltage $V_{N3}$ of 8.45 Volts to be transmitted as the control voltage $V_{BB}$.

Also during the second half of clock cycle $T_1$, the logic high CLK# signal turns on transistor 124, thereby coupling the first terminal of capacitor 104 to the ground supply terminal. As discussed above, the feedback control voltage $V_{BB}$ has a voltage of 8.45 Volts. As a result, transistor 128 turns on, thereby providing a voltage of 4.35 Volts (i.e., the $V_{N2}$ voltage of 4.5 Volts minus the pass transistor voltage drop of 0.15 Volts across transistor 128) to node N4. In response, capacitor 104 is charged to a voltage of 4.35 Volts.

The above-described sequence continues within second stage 112, with capacitors 103 and 104 alternately charging and discharging during each half clock cycle. By about the By about the fifth clock cycle $T_4$, second stage 112 reaches its final operating conditions. At this time, during the first half of each clock cycle, capacitor 103 is charged to a voltage of 5.10 Volts, while capacitor 104 is discharged to provide a voltage $V_{N4}$ of 10.35 Volts. During the second half of each clock cycle, capacitor 104 is charged to a voltage of 5.10 Volts, while capacitor 103 is discharged to provide a voltage $V_{N3}$ of 10.35 Volts.

Under these conditions, capacitors 103 and 104 charge to a voltage which is equal to two times the $V_{DD}$ supply voltage (5.4 Volts) minus two pass transistor voltage drops (0.30 Volts), or about 5.10 Volts. After being charged, capacitors 103 and 104 are discharged at a voltage which is equal to 5.10 Volts plus the output voltage $V_{N1}$ (or $V_{N2}$) Of 5.25 Volts, or 10.35 Volts. Consequently, the voltages $V_{N3}$ and $V_{N4}$ transition between 5.10 Volts and 10.35 Volts in the manner illustrated in FIGS. 6 and 7. The peak voltage of the output signal provided by second stage 112 is therefore twice the peak voltage of the input signal received by second stage 112, minus the pass transistor voltage drop across transistor 125 (or 128). Note that under these conditions, transistors 125 and 128 operate in the saturated region, such that the voltage drop across these pass transistors is equal to 0.15 Volts.

Third Stage

Turning now to third stage 113, transistors 129–130 and 143–144 are connected in a manner similar to transistors 123–124 and 141–142. More specifically, node N3 is coupled to the gate of transistor 143 and to the source and bulk of transistor 144. Node N4 is coupled to the gate of transistor 144 and to the source and bulk of transistor 143. The drains of transistors 143 and 144 are coupled to the drains of n-channel transistors 129 and 130, respectively, and to the first terminals of capacitors 106 and 105, respectively. The gates of n-channel transistors 129 and 130 are coupled to receive the CLK# and CLK signals, respectively, while the sources and wells of transistors 129–130 are connected to the ground supply terminal.

Node N3 is also coupled to the source and gate of transistor 135. Similarly, node N4 is also coupled to the source and gate of transistor 133. The wells associated with transistors 133 and 135 are coupled to the ground supply terminal. As a result, transistors 133 and 135 are connected as diodes. Transistors 131 and 132 are also connected as diodes between the $V_{DD}$ voltage supply terminal and nodes N5 and N6, respectively. The voltages on nodes N5 and N6 are referred to as voltages $V_{N5}$ and $V_{N6}$, respectively. Transistor 134 is connected between transistor 133 and node N5, with the gate of transistor 134 being coupled to node N6. Similarly, transistor 136 is connected between transistor 135 and node N6, with the gate of transistor 136 being coupled to node N5. As described below, third stage 113 approximately doubles the voltages $V_{N3}$ and $V_{N4}$ received from second stage 112, thereby generating output voltages $V_{N5}$ and $V_{N6}$, which have peak voltages of about 19.55 Volts.

Figure 8:
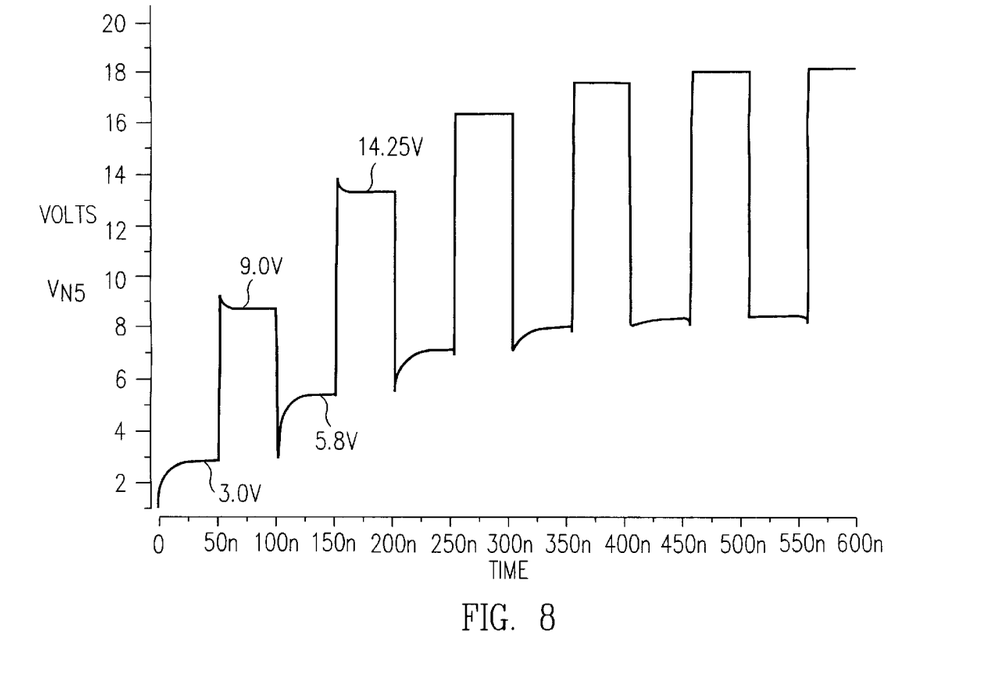
Figure 9:
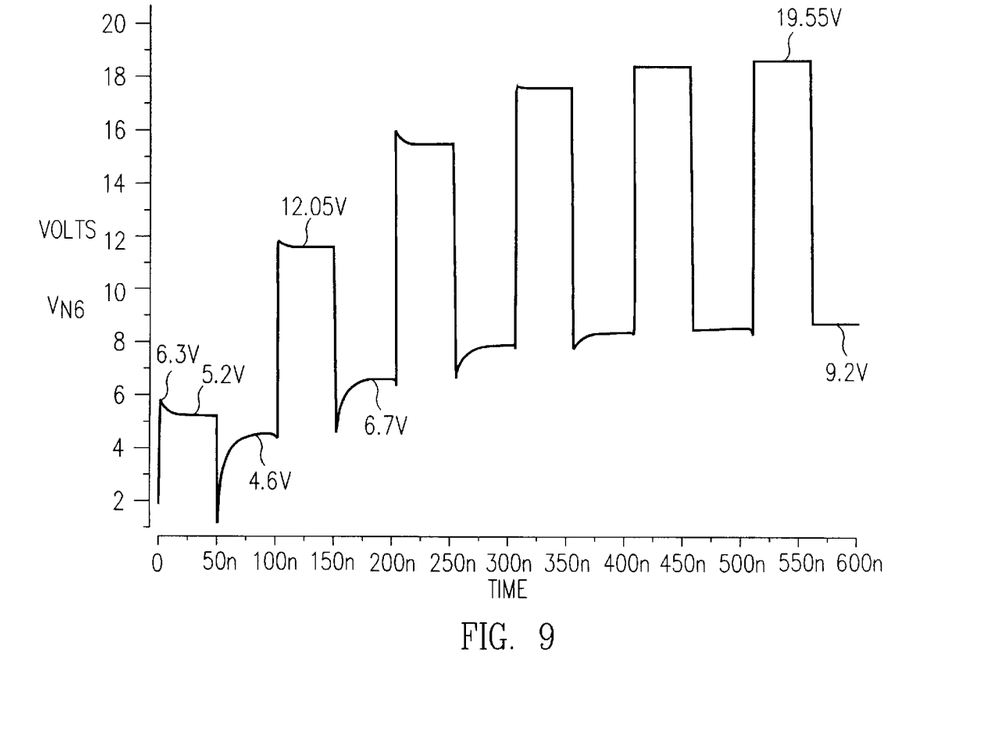

The operation of third stage 113 will now be described. FIGS. 8 and 9 are waveform diagrams illustrating voltages $V_{N5}$ and $V_{N6}$, respectively. Node N6 is initially pulled up to about 2.0 Volts through diode connected transistor 132. During the first half of clock cycle $T_0$, the boosted voltage $V_{N4}$ of 4.3 Volts is applied to the first terminal of capacitor 106. Because node N6 is initially pulled up to 2.0 Volts, capacitor 106 provides a boosted output voltage of about 6.3 Volts (i.e., 2.0 Volts plus 4.3 Volts) during the first half of cycle $T_0$.

Also during the first half of clock cycle $T_0$, n-channel transistor 130 is turned on by the logic high CLK signal, thereby connecting the first terminal of capacitor 105 to ground. The boosted voltage VN6 of 6.3 Volts is applied to the gate of transistor 134, thereby turning on this transistor. At this time, the voltage $V_{N4}$ is transmitted through diode connected transistor 133 and turned on transistor 134, thereby applying a voltage of about 3.0 Volts to node N5. As a result, capacitor 105 is charged to a voltage of about 3.0 Volts during the first half of cycle $T_0$.

As described above, during the second half of clock cycle $T_0$, the voltage $V_{N3}$ is about 6.0 Volts and the voltage $V_{N4}$ is about 3.35 Volts. Consequently, p-channel transistor 144 is turned on, thereby providing a voltage of about 6.0 Volts to the first terminal of capacitor 105. Because capacitor 105 was previously charged to a voltage of 3.0 Volts during the first half of clock cycle To, the voltage $V_{N5}$ is boosted to approximately 9.0 Volts (i.e., 3.0 Volts+6.0 Volts) during the second half of clock cycle $T_0$.

Also during the second half of the clock cycle $T_0$, n-channel transistor 129 is turned on by the logic high CLK# signal, thereby coupling the first terminal of capacitor 106 to the ground supply terminal. The voltage $V_{N3}$ of about 6.0 volts is routed through diode connected transistor 135 to the source of transistor 136. The gate of transistor 136 is coupled to receive the voltage $V_{N5}$, which is approximately 9.0 Volts at this time. Because the voltage applied to the gate of transistor 136 is more than one threshold voltage greater than the voltage applied to the source of transistor 136, transistor 136 is turned on. As a result, node N6 is pulled up to a voltage $V_{N6}$ of about 4.6 Volts. Consequently, capacitor 106 is charged to a voltage of about 4.6 Volts during the second half of clock cycle $T_0$.

As described above, during the first half of clock cycle $T_1$, the voltage $V_{N4}$ is approximately 7.45 Volts and the voltage $V_{N3}$ is approximately 3.95 Volts. As a result, p-channel transistor 143 is turned on, thereby providing approximately 7.45 Volts to the first terminal of capacitor 106. Because capacitor 106 was charged to a voltage of about 4.6 Volts during the second half of clock cycle $T_0$, a boosted voltage of about 12.05 Volts is provided on node N6 as voltage $V_{N6}$.

Also during the first half of the clock cycle $T_1$, the voltage $V_{N6}$ of about 12.05 Volts is provided to the gate of n-channel transistor 134. At this time, the voltage applied to the source of transistor 134 is equal to the voltage $V_{N4}$ (7.45 Volts) minus the voltage drop across diode connected transistor 133 (1.0 Volts). Because the voltage applied to the gate of transistor 134 is more than one threshold voltage greater than the voltage applied to the source of transistor 134, transistor 134 is turned on. As a result, approximately 5.8 Volts is applied to node N6. At the same time, the logic high CLK signal turns on transistor 130, thereby coupling the first terminal of capacitor 105 to the ground supply terminal. Under these conditions, capacitor 105 charges to a voltage of about 5.8 Volts.

During the second half of clock cycle $T_1$, the voltage $V_{N3}$ is 8.45 Volts, and the voltage $V_{N4}$ is 4.35 Volts. As a result, p-channel transistor 144 is turned on, thereby providing a voltage of about 8.45 Volts to the first terminal of capacitor 105. Because capacitor 105 was previously charged to a voltage of 5.8 Volts during the first half of cycle $T_1$, node N5 is boosted to a voltage $V_{N5}$ of about 14.25 Volts.

Also during the second half of clock cycle $T_1$, the logic high CLK# signal turns on transistor 129, thereby coupling the first terminal of capacitor 106 to the ground supply terminal. The voltage $V_{N5}$ of 14.25 Volts is applied to the gate of transistor 136. At this time, the voltage applied to the source of transistor 136 is equal to the voltage VN3 (8.45 Volts) minus the voltage drop across diode connected transistor 135 (1.0 Volts). Because the voltage applied to the gate of transistor 136 is more than one threshold voltage greater than the voltage applied to the source of transistor 136, transistor 136 is turned on. As a result, a voltage of about 6.7 Volts is applied to node N6. Capacitor 106 therefore charges to a voltage of 6.7 Volts during the second half of clock cycle $T_1$.

The above described sequence continues, with capacitor 105 being charged during the first half of every clock cycle, and being discharged during the second half of every clock cycle. Similarly, transistor 106 is charged during the second half of every clock cycle, and is discharged during the first half of every clock cycle.

By about the eighth clock cycle, third stage 113 reaches its final operating conditions. At this time, during the first half of each clock cycle, capacitor 105 is charged to a voltage of 9.2 Volts, while capacitor 106 is discharged to provide a voltage $V_{N6}$ of 19.55 Volts. During the second half of each clock cycle, capacitor 106 is charged to a voltage of 9.2 Volts, while capacitor 105 is discharged to provide a voltage $V_{N5}$ of 19.55 Volts.

Under these conditions, capacitors 105 and 106 charge to a voltage which is equal to four times the $V_{DD}$ supply voltage (10.8 Volts) minus four pass transistor voltage drops (0.60 Volts), minus one diode drop (1.0 Volts). Note that under these conditions, transistors 134 and 136 operate in the saturated region, such that the voltage drop across these pass transistors is equal to 0.15 Volts. Capacitors 105 and 106 discharge to a voltage which is equal to 9.2 Volts plus the output voltage $V_{N3}$ (or $V_{N4}$) (10.35 Volts), or 19.55 Volts. Consequently, the voltages $V_{N5}$ and $V_{N6}$ transition between 9.2 Volts and 19.55 Volts in the manner illustrated in FIGS. 8 and 9. The peak voltage of the output signal provided by third stage 113 is therefore twice the peak voltage of the input signal received by third stage 113, minus the voltage drop across diode-connected transistor 133 (or 135) and the voltage drop across transistor 125 (or 128).

The voltages $V_{N5}$ and $V_{N6}$ are provided as output voltages of charge pump 100. In a particular embodiment, nodes N5 and N6 are each connected to a corresponding diode. Each of these diodes, in turn, is connected to a common terminal of an output capacitor. The voltages $V_{N5}$ and $V_{N6}$ thereby charge the output capacitor.

In the foregoing manner, each stage of charge pump 100 generates an output voltage that is approximately twice the input voltage provided to the stage. Charge pump reaches its maximum value relatively quickly (i.e., after about eight cycles of the CLK signal) with an exponential increase in the output voltage. The feedback voltages $V_{AA}$ and $V_{BB}$ enable transistors 125 and 128 to operate in the saturated region, thereby enabling the output voltages of the second stage 112 to be pumped to a higher voltage. Similarly voltages $V_{N5}$ and $V_{N6}$ are used as feedback voltages within third stage 113 to cause transistors 134 and 136 to operate in the saturated region, thereby enabling third stage 113 to be pumped to a higher voltage.

Although invention has been described in connection with several embodiments, it is understood that this invention is not limited to the embodiments disclosed, but is capable of various modifications which would be apparent to a person skilled in the art. For example, although the present invention has been described in connection with a charge pump having three stages, it is understood that charge pumps having fewer or more stages can be implemented in accordance with the teachings of the present disclosure. Thus, the invention is limited only by the following claims.

What is claimed is:

1. A charge pump circuit comprising:
   a first stage coupled to receive an input signal, wherein the first stage is configured to generate first output signal and a complementary second output signal in response to the input signal, the first and second output signals each varying between a first voltage and a second voltage that is approximately twice the first voltage;
   a second stage coupled to receive the first and second output signals from the first stage, wherein the second stage is configured to generate a third output signal and a complementary fourth output signal in response to the first and second output signals, each of the third and fourth output signals varying between the second voltage and a third voltage that is approximately twice the second voltage, the second stage including a first transistor having a drain terminal coupled to receive the first output signal from the first stage, and a second transistor having a drain terminal coupled to receive the second output signal from the first stage; and
   a feedback circuit configured to route the fourth output signal to a gate of the first transistor and configured to route the third output signal to a gate of the second transistor.

2. The charge pump circuit of claim 1, wherein the second stage comprises:
   a first capacitor having a first terminal coupled to a source of the first transistor;

a second capacitor having a first terminal coupled to a source of the second transistor;

a first switch coupled between a second terminal of the first capacitor and a ground supply terminal, the first switch operating in response to the input signal; and a second switch coupled between a second terminal of the second capacitor and the ground supply terminal, the second switch operating in response to the complement of the input signal.

3. The charge pump of claim 1, wherein the second voltage is equal to two times the first voltage minus a voltage drop across the source and drain of the first transistor.

4. The charge pump of claim 1, further comprising a third stage coupled to receive the third and fourth output signals, wherein the third stage is configured to generate a fifth output signal and a complementary sixth output signal in response to the third and fourth output signals, the fifth and sixth output signals varying between the third voltage and a fourth voltage that is approximately twice the third voltage.

5. The charge pump of claim 4, wherein the third voltage is equal to four times the first voltage minus three times a voltage drop across the source and drain of the first transistor.

6. The charge pump of claim 4, wherein the fourth voltage is equal to eight times the first voltage minus seven times a voltage drop across the source and drain of the first transistor minus a voltage drop across a diode in the third stage.

7. A method of generating a boosted voltage in response to an input signal, the method comprising the steps of:

generating a first pair of complementary output signals in response to the input signal in a first stage, the first pair of complementary output signals varying between a first voltage and a second voltage that is approximately twice the first voltage;

generating a second pair of complementary output signals in response to the first pair of complementary output signals in a second stage, each of the second pair of complementary output signals varying between the second voltage and a third voltage that is approximately twice the second voltage; and providing the second pair of complementary output signals to gates of corresponding transistors which are configured to transmit the first pair of complementary output signals from the first stage to the second stage.

8. The method of claim 7, further comprising the steps of:

generating a third pair of complementary output signals in response to the second pair of complementary output signals in a third stage, each of the third pair of complementary output signals varying between the third voltage and a fourth voltage that is approximately twice the third voltage.

9. The method of claim 7, wherein the steps of generating the first pair of complementary output signals and the second pair of complementary output signals comprises the steps of:

charging a first capacitor to a supply voltage minus a source-to-drain voltage drop across one transistor of the pair of transistors during a first half clock cycle;

charging a second capacitor to two times the supply voltage minus two times the source-to-drain voltage drop during the first half clock cycle;

discharging the first capacitor and the second capacitor during a second half clock cycle by connecting the first capacitor and the second capacitor in series and applying the supply voltage to the first capacitor, wherein the output voltage supplied by the second capacitor is equal to four times the supply voltage minus three times the source-to-drain voltage drop.

10. The method of claim 9, first voltage minus three times the source-to-drain voltage drop during the first half clock cycle.

11. A charge pump stage for connection between a previous charge pump stage and a subsequent charge pump stage, the charge pump stage comprising:

a first voltage supply terminal coupled to receive a first supply voltage;

a ground supply terminal coupled to receive a ground supply voltage;

a first capacitor having a first terminal and a second terminal;

a second capacitor having a first terminal and a second terminal;

a switching circuit coupled to the second terminals of the first and second capacitors, wherein during a first half cycle, the switching circuit is configured to couple the second terminal of the first capacitor to the ground supply terminal and the second terminal of the second capacitor to the previous charge pump stage, and wherein during a second half cycle, the switching circuit is configured to couple the second terminal of the first capacitor to the previous charge pump stage and the second terminal of the second capacitor to the ground supply terminal; a first transistor having a source coupled to the first terminal of the first capacitor, a drain coupled to the previous charge pump stage and a gate coupled to the first terminal of the second capacitor; and a second transistor having a source coupled to the first terminal of the second capacitor, a drain coupled to the previous charge pump stage and a gate coupled to the first terminal of the first capacitor.

12. The charge pump stage of claim 11, further comprising:

a first diode element coupled between the first voltage supply and the first terminal of the first capacitor; and a second diode element coupled between the first voltage supply and the first terminal of the second capacitor.

13. The charge pump stage of claim 11, wherein the gate of the first transistor is coupled to the first terminal of the second capacitor by a third transistor having a source coupled to the first terminal of the second capacitor, a gate coupled to the first terminal of the first capacitor and a drain coupled to the gate of the first transistor, and wherein the gate of the second transistor is coupled to the first terminal of the first capacitor by a fourth transistor having a source coupled to the first terminal of the first capacitor, a gate coupled to the first terminal of the second capacitor and a drain coupled to the gate of the second transistor.

* * * * *